United States Patent

[11] 3,616,376

[72] Inventors Nelson S. Marans
 12120 Kerwood Road, Silver Spring, Md. 20904;
 Donald P. Gush, 1811 Kanawha St., Hyattsville, Md. 20783
[21] Appl. No. 759,778
[22] Filed Sept. 13, 1968
[45] Patented Oct. 26, 1971
 Continuation-in-part of application Ser. No. 535,013, Mar. 17, 1966, now abandoned.

[54] PREPARATION OF 1-HEPTANAMIDE USING HIGH-ENERGY IONIZING RADIATION
 9 Claims, No Drawings
[52] U.S. Cl. .................................................. 204/162, 204/158
[51] Int. Cl. .................................................. B01j 1/10
[50] Field of Search .......................................... 204/162, 158

[56] References Cited
UNITED STATES PATENTS
3,325,388  6/1967  Elad et al. ..................... 204/162

Primary Examiner—Benjamin R. Padgett
Attorneys—Elton Fisher and Kenneth E. Prince ABSTRACT: In abstract, this invention is directed to a process for preparing 1-heptanamide by irradiating a first liquid system with free radical-inducing radiation in the substantial absence of oxygen, the first liquid system being selected from the group consisting of; (i) a first composition consisting essentially of about 50–99.9 parts formamide, about 0–50 parts 1-heptanamide, and 1-hexene; and (ii) a second composition consisting essentially of about 50–99.8 parts formamide, about 0.1–5 parts acetone, about 0–45 parts 1-heptanamide, and 1-hexene, the mole ratio of 1-hexene:formamide in the first liquid solution being about 1:300–2,000, separating, and recovering the thus formed 1-heptanamide, all as recited hereinafter.

PREPARATION OF 1-HEPTANAMIDE USING HIGH-ENERGY IONIZING RADIATION

CROSS-REFERENCE TO RELATED APPLICATION

This is a continuation-in-part of our copending application Ser. No. 535,013, filed Mar. 17, 1966 and now abandoned.

BACKGROUND OF THE INVENTION

This invention is in the field of 1-heptanamide preparation, the heptanamide being formed by the irradiation of a first liquid system consisting essentially of 1-hexene in formamide. Said system can (and usually does) contain 1-heptanamide product except at the instant of startups in runs where the starting feedstock is a mixture of 1-hexene and formamide which is free of 1-heptanamide. Said system can also contain acetone—especially where irradiated with ultraviolet radiation. Said system is alcohol-free.

A prior art procedure for preparing 1-heptanamide is taught by U.S. Pat. No. 3,325,388.

SUMMARY OF THE INVENTION

In summary, this invention is directed to a process for preparing 1-heptanamide comprising:

a. forming 1-heptanamide by irradiating a first liquid system with free radical-inducing radiation in the substantial absence of oxygen, the first liquid system being selected from the group consisting of; (i) a first composition consisting essentially of about 50–99.9 parts formamide, about 0–50 parts 1-heptanamide, and 1-hexene; and (ii) a second composition consisting essentially of about 50–99.8 parts formamide, about 0.1–5 parts acetone, about 0–45 parts 1-heptanamide, and 1-hexene, the mole ration of 1-hexene:formamide in the first liquid system being about 1:300–2,000, preferably about 1:500–1,500, and more preferably about 1:700–1,450 or 1:1,000–1,400 (The first liquid system can be 1-heptanamide-free at the instant a run is started using a 1-heptanamide-free first composition or a 1-heptanamide-free second composition as feedstock. Obviously, the first liquid system will contain 1-heptanamide as soon as the first molecule of 1-heptanamide is formed therein.);

b. separating at least a portion of the 1-heptanamide from the irradiated first system; and c. recovering the separated 1-heptanamide.

In a preferred embodiment ("embodiment A") of the process set forth in the above summary the free radical-inducing radiation is ultraviolet radiation having a wavelength of about 2,500–4,000 A. and the first liquid system is the second composition.

In a preferred embodiment of the process set forth in embodiment A, supra, the ultraviolet radiation is applied at a rate of about 0.1–10 watts per square centimeter of surface per second.

In other preferred embodiments of the process set forth in the above summary:

1. The free radical-inducing radiation is high-energy ionizing radiation (0.1–20 megarads total dose) and the first liquid system is the first composition; and
2. The first liquid system is irradiated in a closed system under an atmosphere of an inert gas—preferably nitrogen, helium, or argon.

In another preferred embodiment ("embodiment B") this invention is directed to a fully continuous process for preparing 1-heptanamide comprising:

a. continuously forming 1-heptanamide and a 1-hexene-poor first liquid system by continuously irradiating with free radical-inducing radiation in the substantial absence of oxygen in a radiation zone a second liquid system selected from the group consisting of; (i) a first composition consisting essentially of about 50–100 parts formamide, 0–50 parts 1-heptanamide, and 1-hexene; and (ii) a second composition consisting essentially of about 50–99.9 parts formamide, about 0.1–5 parts acetone, about 0–50 parts 1-heptanamide, and 1-hexene, the mole ratio of 1-hexene to formamide in the second liquid system being about 1:300–2,000, preferably about 1:500–1,500, or more preferably about 1:700–1,450 or 1:1,000–1,400(The second liquid system can be 1-heptanamide-free at the instant a run is started using a 1-heptanamide-free first composition or a 1-heptanamide-free second composition as feedstock. Obviously, the second liquid system will contain 1-heptanamide as soon as the first molecule of 1-heptanamide is formed therein.);

b. continuously withdrawing a portion of the first liquid system from the radiation zone and separating at least a portion of the 1-heptanamide therefrom to form; (i) a separated 1-heptanamide fraction; and (ii) a 1-heptanamide-poor third liquid system;

c. continuously regenerating the second liquid system by continuously adding 1-hexene to the 1-heptanamide-poor third liquid system at a rate to provide a mole ratio of 1-hexene to formamide of about 1:300–2,000 (preferably about 1:500–1,500, or more preferably about 1:700–1,450 or 1:1,000–1,400);

d. continuously recycling the regenerated second liquid solution to the radiation zone; and e. continuously recovering the separated 1-heptanamide.

In preferred embodiments of the process set forth in embodiment B, supra:

1. The free radical-inducing radiation is high-energy ionizing radiation and the second liquid system is the first composition; and
2. The free radical-inducing radiation is ultraviolet radiation having a wavelength of about 2,500–4,000 A. and the second liquid system is the second composition.

DETAILED DESCRIPTION OF THE INVENTION

It is an object of this invention to provide a method for preparing 1-heptanamide (hereinafter called "heptanamide" or "1-heptanamide") by reacting formamide with 1-hexene (hereinafter called "hexene" or "1-hexene") using free radical-inducing radiation (e.g., ultraviolet radiation or high-energy ionizing radiation) to bring about the reaction between the formamide and 1-hexene. It is another object of this invention to provide a method for synthesizing heptanamide by reacting formamide with 1-hexene. Other objects of this invention will be readily apparent to those skilled in the art.

When using ultraviolet radiation, we prefer to apply said radiation at the rate of about 0.1–10 watts per square centimeter of surface per second, and when using high-energy ionizing radiation (e.g., high-energy electrons, gamma rays, X-rays, protons or neutrons) we prefer to use a total dose of about 0.1–20 megarads. When using ultraviolet radiation we have found it necessary or desirable to keep the concentration of 1-hexene in the formamide-acetone-1-hexene system or the formamide-acetone-1-hexene-1-heptanamide system undergoing radiation within the limit of about 1 mole of 1-hexene per 300–2,000(preferably 500–1,500, or more preferably 700–1,450900–1,425, or 1,000–1,400) miles, of formamide thereby to prevent poor results (low yields of 1-heptanamide and the formation of undesirable side-products) caused by competitive reactions, namely coupling of 1-hexene to give higher olefins as well as products formed by the reaction of such olefins with formamide.

Heptanamide is a well-known chemical substance which is used as an intermediate in the synthesis of organic acids and esters; also, it can be used as a chain stopper in polymer production.

The preparation of heptanamide by irradiating and reacting 1-hexene and formamide in the presence of an alcohol or alcohols (e.g., in an alcoholic solution) is known. We have found that heptanamide can be formed by reacting 1-hexene with formamide in the absence of alcohol or alcohols. In the process of our invention, 1-hexene is mixed with formamide (e.g., to form a liquid system (e.g., a saturated or substantially saturated solution of 1-hexene in a system consisting essentially of: (a) formamide and 1-hexene; (b) formamide, 1-hexene, and 1-heptanamide; (c) formamide, 1-hexene, and acetone; or (d) formamide, 1-hexene, 1-heptanamide, and acetone)) and the resulting liquid system is subjected to free radical-inducing radiation. As noted supra, the radiation can be ultraviolet radiation having a wave length of about 2,500–4,000 Angstrom units (A.), high-energy electrons, protons, neutrons, gamma rays, and X-rays. Ultraviolet rays can be generated by conventional ultraviolet lamps or by the sun.

High-energy electrons, protons, neutrons, gamma rays, and X-rays can be emitted from radioactive isotopes or generated by appropriate conventional apparatus. We have found that irradiation should be conducted in the substantial absence of oxygen. Systems undergoing irradiation can be purged of oxygen with a stream of inert gas such as nitrogen, helium, argon, and the like, or by evacuation. Yields of heptanamide are substantially lower in the presence of air or oxygen than they are in the absence of air or oxygen. When using high-energy ionizing radiation we generally prefer to keep the concentration of 1-hexene in the formamide-1-hexene or formamide 1-hexene-1-heptanamide system undergoing radiation within the limit of about 1 mole of 1-hexene per 300–2,000 (preferably about 500–1,500, or more preferably 700–1,450, or 900–1,425, or 1,000–1,400) moles of formamide, thereby to prevent poor results (low yields of 1-heptanamide and the formation of undesirable side products) caused by competitive reactions, namely coupling of 1-hexene to give higher olefins as well as products formed by the reaction of such olefins with formamide. However, when using such high-energy radiation, we have obtained excellent results with such systems consisting essentially of about 99–99.9 parts formamide and about 0.1–2 parts 1-hexene and about 0–25 (or more) parts of 1-heptanamide.

The process of this invention can, as noted supra, be conducted by irradiating a solution formed by saturating formamide, formamide-acetone mixtures, formamide-1-heptanamide mixtures, and formamide-acetone-1-heptanamide mixtures with 1-hexene. Since tests have shown that quantities of heptanamide up to about 50 parts per 50 parts of formamide are not decomposed to any appreciable extent when subjected to irradiation, we prefer to conduct the process of our invention by irradiating a formamide-1-hexene mixture and adding thereto more 1-hexene as the reaction proceeds. This procedure results in a buildup of heptanamide in the system. When the concentration of heptanamide reaches a desired concentration (for optimum results generally about 10–15 parts of said heptanamide per 90–85 parts of formamide) the mixture or a portion thereof is removed from the radiation zone and processed to recover 1-heptanamide therefrom.

The heptanamide can be separated from the reaction mixture and recovered by such conventional methods as distillation or chromatography. Other methods for separating and recovering the product will be readily apparent to those skilled in the art. Of course, the unreacted formamide and any 1-hexene (and any sensitizer) dissolved therein are recovered and returned to the reaction zone (radiation zone) wherein the 1-heptanamide is formed.

We have found that if ultraviolet radiation is used in the process of our invention it is necessary to include a sensitizer in the system under irradiation. We have found that acetone (a ketone) is an excellent and very superior sensitizer; while benzophenone, acetophenone, or azobisformamide can be used as sensitizers, they are less effective than acetone. it was also noted that the two other ketones (benzophenone and acetophenone) are much less effective as sensitizers than is azobisformamide.

When using ultraviolet radiation we prefer to use about 0.1–10 watts per square centimeter per second. However, we have obtained excellent results when using about 2–3 watts per square centimeter per second. When using electron radiation or X-ray radiation, or gamma ray radiation, or proton radiation we prefer to use a radiation dose of about 0.1–20 megarads. However, we have obtained excellent results with a radiation dose of about 2–10 megarads.

We have also found, as stated supra, that a sensitizer (e.g., acetone) is essential when using ultraviolet radiation. However, we have found that no sensitizer is needed when using electron beam, X-ray, gamma ray, or proton beam radiation.

When using electron beam, proton beam, X-ray or gamma ray radiation, we prefer to irradiate a mixture consisting essentially of formamide (or a formamide-1-heptanamide mixture having at least about 50 parts of formamide per 50 parts of 1-heptanamide) saturated with 1-hexene. However, a slight excess of 1-hexene can be present without adversely effecting the results. On the other hand, with a large excess of hexene (e.g., more than about 1 part of 1-hexene per 99–100 parts of formamide), poor results are obtained because competitive reactions occur, namely coupling of 1-hexene to give higher olefins as well as the products of the reaction of these olefins with formamide to give higher molecular weight amides.

Regardless of source of radiation we prefer to let the heptanamide build up in the system until its concentration is about 5–15 parts per 100 parts of total weight before separating and recovering the heptanamide or a portion thereof.

When operating the process of this invention we prefer to add 1-hexene to the system continuously, thereby to maintain an effective concentration of 1-hexene in the radiation zone. This can be done in laboratory apparatus by: (a) adding 1-hexene dropwise from a separatory funnel into the radiation zone while stirring the liquid within said zone; or (b) by suspending a quantity of 1-hexene in a shielded zone over a radiation zone filled with formamide (which is more dense than 1-hexene) and stirring at the interface to dissolve 1-hexene in the lower formamide layer. (The shield of said shielded zone prevents radiation from causing 1-hexene within said zone to couple with the resulting formation of higher molecular weight unsaturated hydrocarbons.) Other methods for adding 1-hexene to the system will be readily apparent to those skilled in the art.

When operating the process of our invention with plant scale apparatus we prefer to add 1-hexene to the system continuously by: (a) withdrawing a portion (a side or slipstream) of the reaction mixture (which contains 1-hexene dissolved in formamide (plus heptanamide after the reaction has been started) plus sensitizer—if added to the system) from near the bottom of the reaction zone (radiation zone); (b) passing the thus removed portion through a pump while; (c) adding 1-hexene to said portion on the suction side of said pump; and (d) returning the material exit said pump to the reaction zone—preferably to the upper portion of said zone. Generally, after the 1-heptanamide concentration in the reaction (radiation) zone has reached a predetermined level, frequently 5–25 or 10–15 parts (less frequently 26–50 parts) per 100 parts total weight of material in said zone, at least a portion of the 1-heptanamide is separated from the slipstream before adding 1-hexene to the slipstream and before returning said slipstream to the radiation zone. (The radiation zone is shielded to prevent substantial amounts of radiation from escaping therefrom and contacting the 1-hexene storage zone or the mixing apparatus and 1-hexene line (or lines) leading thereto.) Conventional means (e.g., flowmeters and mechanically or manually operated valves) can be used to control the rate at which 1-hexene is added to the system. This makes it easy for the operator to maintain a system consisting essentially of formamide, 1-hexene, heptanamide, and sensitizer (e.g., acetone), if used, in the radiation zone. The process can be operated batchwise (removing a batch of mixture from the radiation zone from time to time for product recovery while at about the same time adding a makeup batch of hexene-formamide or hexene-formamide-acetone mixture to the radiation zone), or as noted supra, a side stream can be continuously removed for product recovery—while continuously adding makeup formamide (e.g., with the makeup 1-hexene) and sensitizer—if used.

The process of our invention can be operated within the temperature range of about −20° to 100° C. However, we prefer to operate said process at about 0–65° C. and have found that optimum results are obtained within the temperature range of about 10°–45° C. When operating above about 45°–50° C. we prefer to use a pressurized reaction system to prevent the loss of 1-hexene (and acetone where present) by evaporation.

The invention will be better understood by reference to the following specific but nonlimiting examples.

EXAMPLE I

A solution of 1-hexene in formamide was prepared by shaking together about 100 g. of 1-hexene and 100 g. of formamide in a separatory funnel. The lower layer was drawn off and upon analysis was found to consist essentially of a mixture of about 99.87 parts formamide and about 0.13 part of 1-hexene. A portion of this solution was placed in a reactor made of Pyrex glass, purged with helium and irradiated, in the substantial absence of air, with a high-energy electron beam using conventional apparatus to supply the electron beam. At a total radiation dose of 2 megarads, conversion, based on the 1-hexene originally present in the system, was 44 percent theory; while using another portion of said solution with a total radiation dose of 10 megarads the conversion was 53 percent of theory. At a total radiation dose of 20 megarads, with a third portion of said solution, conversion was 60 percent of theory. In a control (without radiation) no heptanamide could be detected. Radiation temperature was about 25° C. in each test. (Conversion was based on 1-hexene charged.)

EXAMPLE II

In this run 85.6 parts of formamide and 0.9 part of acetone were mixed together and placed in a glass container. Then 13.5 parts of 1-hexene were added to said container. Since 1-hexene is lighter than the formamide-acetone-mixture, the undissolved hexene floated on top of the aforesaid mixture, thereby to form a two-phase system. The system was purged with nitrogen and a motor-driven stirrer was placed in the system so that the impeller of said stirrer was at about the interface of the two phases. The top phase or layer of said system was shielded from radiation while irradiating the heavier bottom layer with ultraviolet light having a wavelength of about 2,500–4,000 A. During irradiation the system was continuously purged with nitrogen, and, the stirrer was operated at such rate that the lower phase of the two-phase system was substantially saturated with 1-hexene. Temperature of the lower phase during irradiation was about 25° C. After about 2 hours irradiation, the lower phase analyzed about 0.44 percent of heptanamide; after about 4 hours said phase analyzed about 0.98 percent heptanamide; and after about 6 hours said phase analyzed about 1.7 percent heptanamide. No reaction product other than heptanamide could be detected in the lower phase, thereby showing substantially quantitative conversion of 1-hexene to heptanamide.

EXAMPLE III

The general procedure of example II was repeated; however, in this instance the procedure was modified by omitting the acetone. No heptanamide was formed, thereby showing that, where using ultraviolet radiation, a sensitizer is necessary.

EXAMPLE IV

A batch of formamide was saturated with 1-hexene at about 30° C. to form a first mixture which was placed in a radiation zone where said mixture was irradiated at about 30° C. with an electron beam at the rate of about 0.3 megarads per second. As the 1-hexene reacted a slipstream was continuously withdrawn from the radiation zone, continuously saturated with 1-hexene, and continuously returned to said zone. This procedure was continued until the concentration of the 1-heptanamide (formed by irradiation of the mixture in the radiation zone) in the mixture within the radiation zone reached about 10 percent (based on the total weight of the liquid mixture within said zone) after which time substantially all of the 1-heptanamide present in the slipstream was continuously separated from said stream before adding 1-hexene thereto and before returning the resulting 1-hexene-enriched slipstream to the radiation zone. The separated 1-heptanamide was recovered. Conversion at the end of a 48-hour run was 55 percent of theory based on the 1-hexene charged.

As used herein, the term "percent (%)" means parts per hundred by weight unless otherwise defined where used, and the term "parts" means parts by weight unless otherwise defined where used. The term "conversion" means one pass yield.

We claim:
1. A process for preparing 1-heptanamide comprising:
    a. irradiating in the substantial absence of oxygen, a mixture consisting essentially of about 59–99.9 parts formamide, about 0–50 parts 1-heptanamide, and 1-hexene, the mole ratio of 1-hexene: formamide in said mixture being about 1:300–A2,000, with about 0.1–20 megarads of high-energy ionizing radiation to form 1-heptanamide;
    b. separating at least a portion of the 1-heptanamide from the irradiated mixture; and
    c. recovering the separated 1-heptanamide.
2. The process of claim 1 in which the mole ratio of 1-hexene:formamide is 1:1,000–1,400.
3. The process of claim 1 in which the mixture is irradiated with about 2–10 megarads of high-energy ionizing radiation.
4. The process of claim 1 in which the mixture is irradiated under an atmosphere of inert gas.
5. The process of claim 1 in which the inert gas is nitrogen, helium or argon.
6. The process of claim 1 in which high-energy ionizing radiation is an electron beam.
7. The process of claim 1 in which the high-energy ionizing radiation is gamma ray radiation.
8. A fully continuous process for preparing 1-heptanamide comprising:
    a. continuously irradiating with 0.1–20 megarads of high-energy ionizing radiation in a radiation zone in the substantial absence of oxygen, a first liquid system consisting essentially of about 50–100 parts formamide, 0–50 parts 1-heptanamide, and 1-hexene, the mole ratio of 1-hexene to formamide in the first liquid system being about 1:300–2,000 to continuously form 1-heptanamide in the resulting irradiated second liquid system;
    b. continuously withdrawing a portion of irradiated second liquid system from the radiation zone and separating at least a portion of the 1-heptanamide therefrom to form; (i) a separated 1-heptanamide fraction; and (ii) a 1-heptanamide-poor third liquid system;
    c. continuously adding 1-hexene to the 1-heptanamide-poor third liquid system to form a 1-hexene-enriched fourth liquid system;
    d. continuously recycling the 1-hexene enriched fourth liquid system to the radiation zone to continuously maintain the mole ratio of 1-hexene to formamide in the first liquid system within the range of about 1:300–2,000; and
    e. continuously recovering the separated 1-heptanamide.
9. The process of claim 8 in which the high-energy ionizing radiation is gamma ray radiation.

* * * * *